(12) United States Patent
Knasko

(10) Patent No.: US 8,347,904 B2
(45) Date of Patent: Jan. 8, 2013

(54) ACCESSORY SUPPORT BRACKET FOR A PORTABLE STRUCTURE

(76) Inventor: Steven J. Knasko, Bartlett, IL (US)

( * ) Notice: Subject to any disclaimer, the term of this patent is extended or adjusted under 35 U.S.C. 154(b) by 0 days.

(21) Appl. No.: 13/297,143

(22) Filed: Nov. 15, 2011

(65) Prior Publication Data

US 2012/0060880 A1   Mar. 15, 2012

Related U.S. Application Data

(63) Continuation of application No. 12/571,687, filed on Oct. 1, 2009, now abandoned.

(51) Int. Cl.
*E04H 15/02* (2006.01)
(52) U.S. Cl. ...................................... 135/96; 135/120.1
(58) Field of Classification Search .................... 135/66, 135/68, 96, 161, 99, 120.1, 120.3, 139, 140; 248/126, 200, 218.4, 219.4, 229.21, 205.1, 248/176.1, 187.1, 220.1, 228.2, 229.11, 231.31, 248/925
See application file for complete search history.

(56) References Cited

U.S. PATENT DOCUMENTS

| | | | | |
|---|---|---|---|---|
| 1,894,146 A * | 1/1933 | Baker | | 281/44 |
| 2,311,049 A * | 2/1943 | Hedden | | 135/68 |
| 2,553,730 A * | 5/1951 | Taylor | | 135/68 |
| 3,985,148 A * | 10/1976 | Cadman | | 135/66 |
| 4,132,380 A * | 1/1979 | Pastore | | 248/224.61 |
| 4,146,045 A * | 3/1979 | Grant | | 135/66 |
| 5,433,416 A * | 7/1995 | Johnson | | 248/475.1 |
| D360,748 S * | 8/1995 | Larsen et al. | | D3/10 |
| 5,687,942 A * | 11/1997 | Johnson | | 248/223.41 |
| 5,983,912 A * | 11/1999 | Leu | | 135/66 |

\* cited by examiner

*Primary Examiner* — Noah Chandler Hawk
(74) *Attorney, Agent, or Firm* — Erickson Law Group, PC

(57) ABSTRACT

A blind accessory support bracket is disclosed. The bracket is configured to fit into the X-shaped framework of a hunting blind, tent, or portable structure. Abutments are located on either side of the bracket, containing the framework therebetween, and securing the bracket in place. The bracket may provide a variety of different supports, including a gun brace, a camera mount, or a shelf. When the bracket is located on framework near an opening of the blind, it may assist in aiming or shooting of a camera or gun at a target outside the blind.

15 Claims, 14 Drawing Sheets

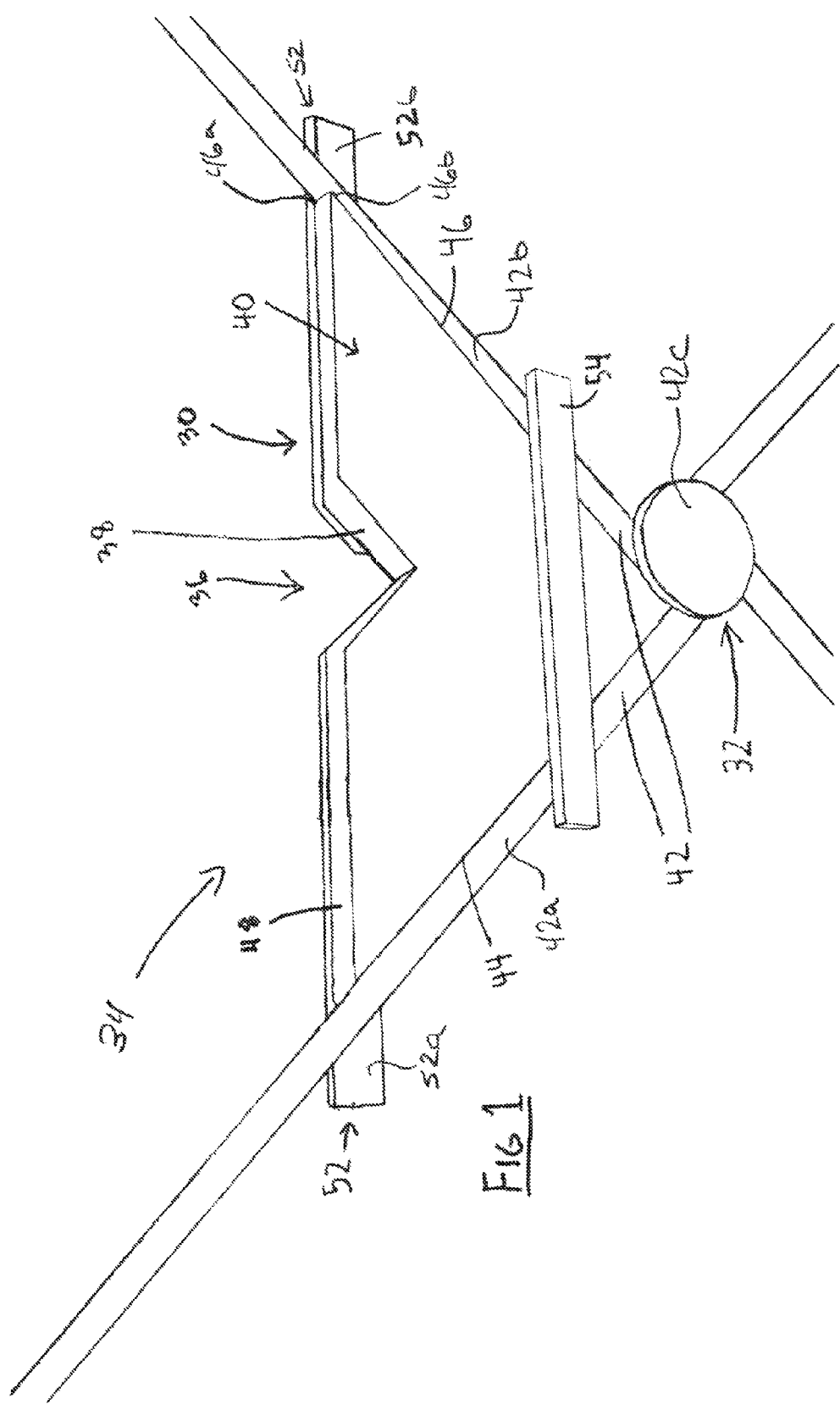

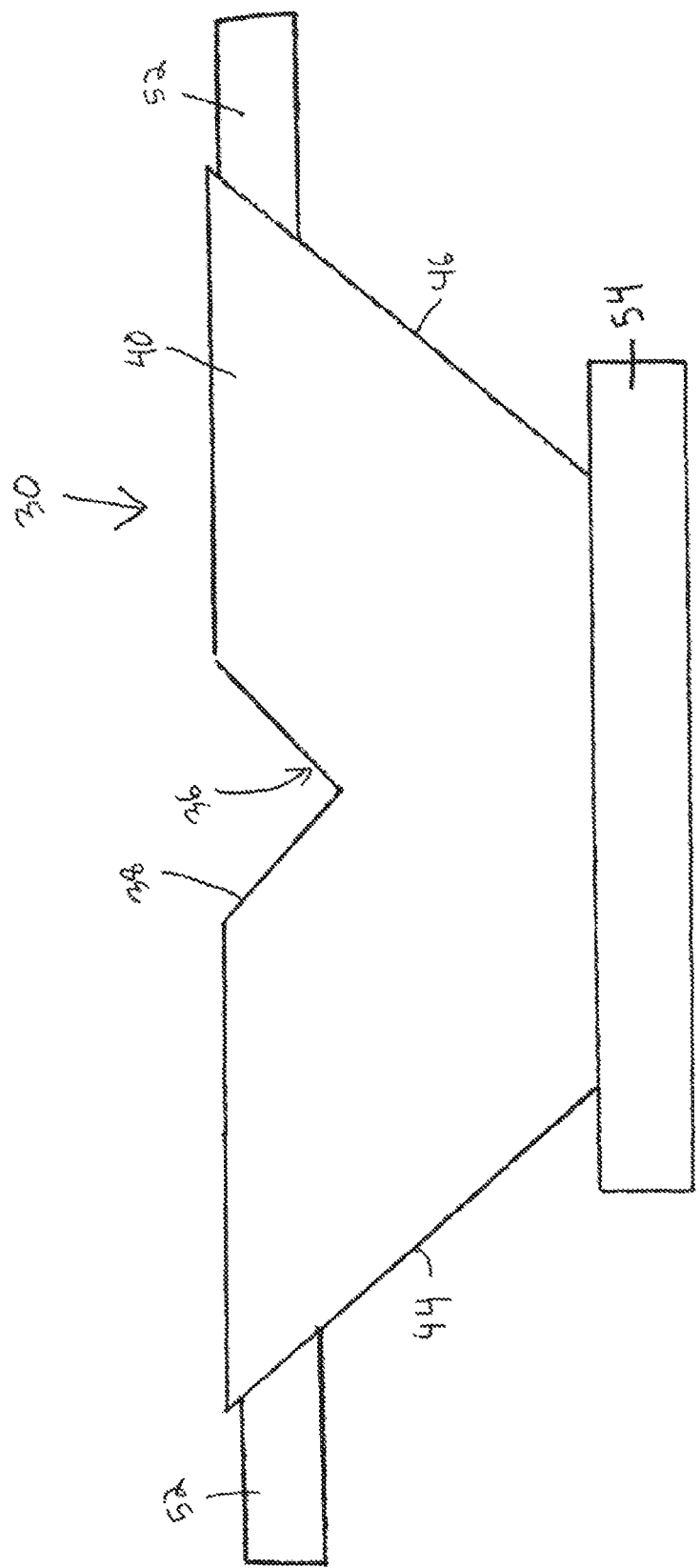

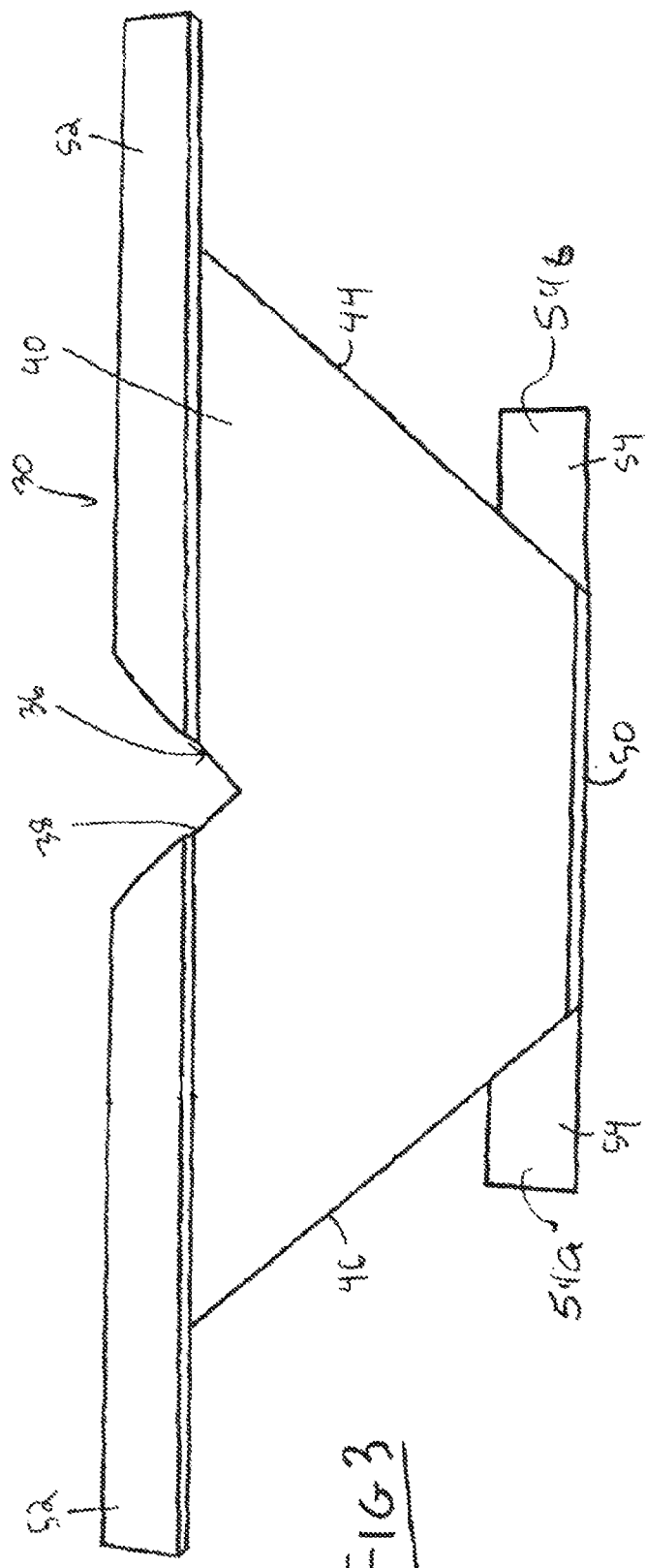

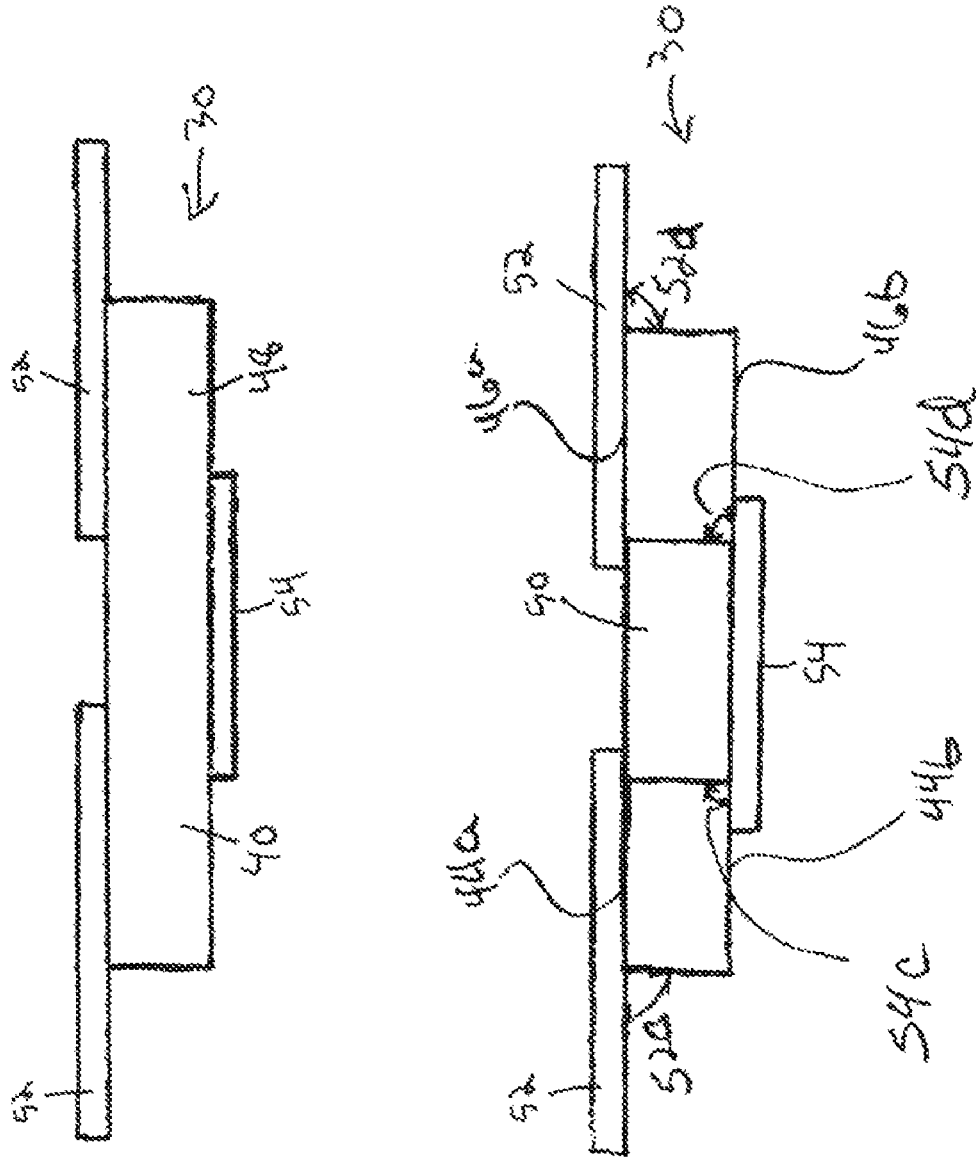

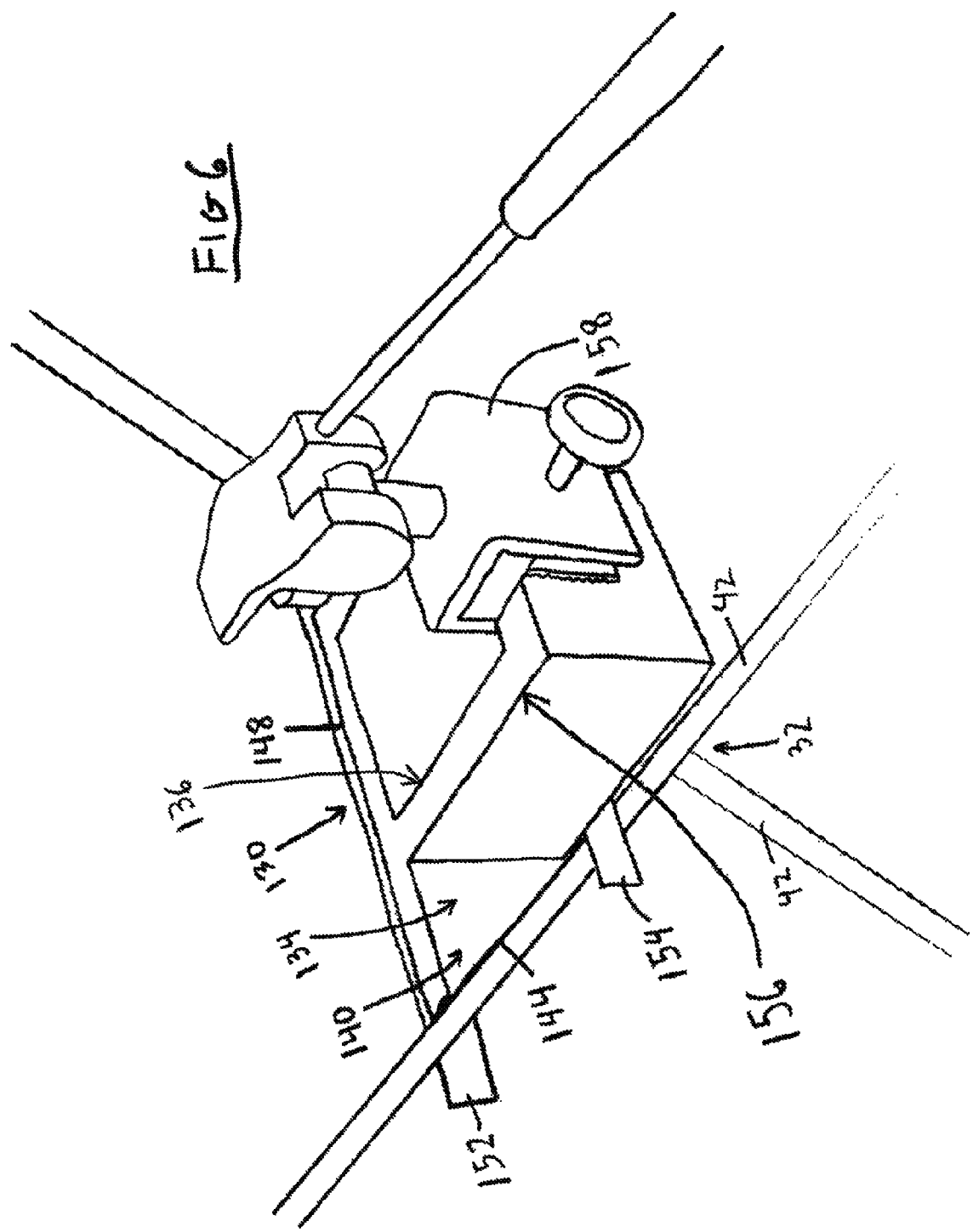

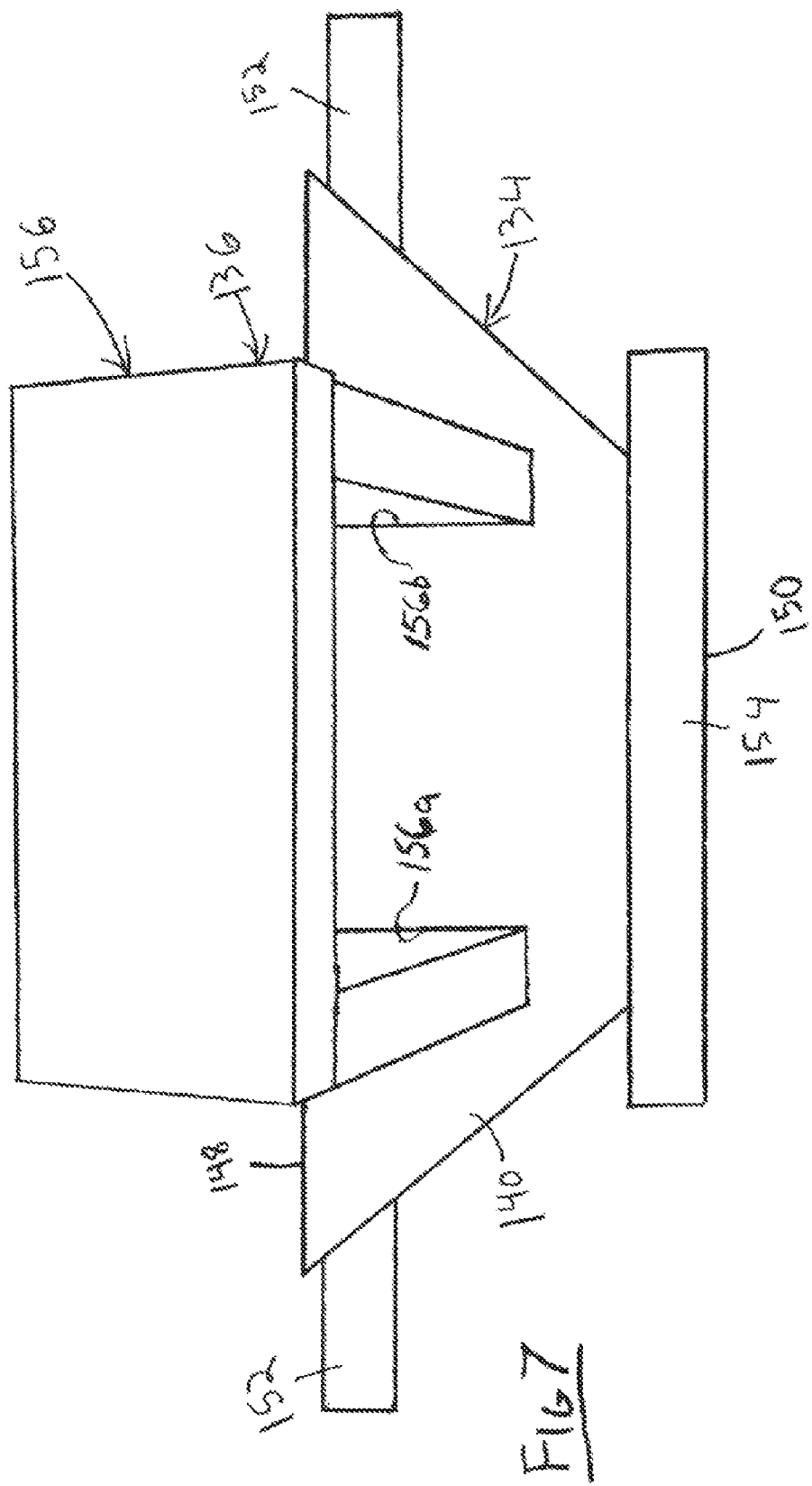

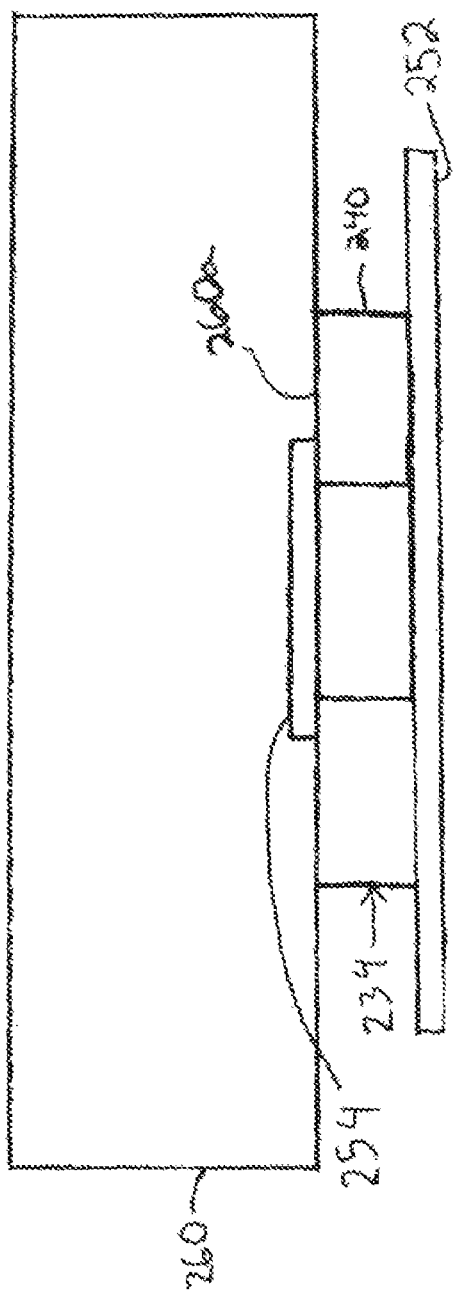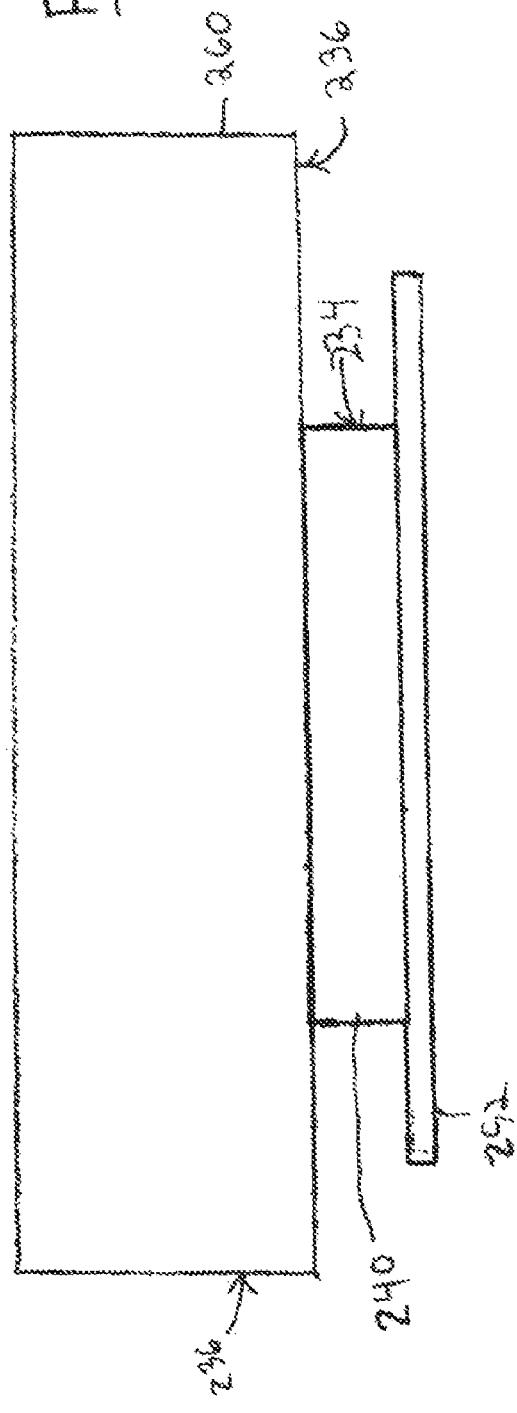

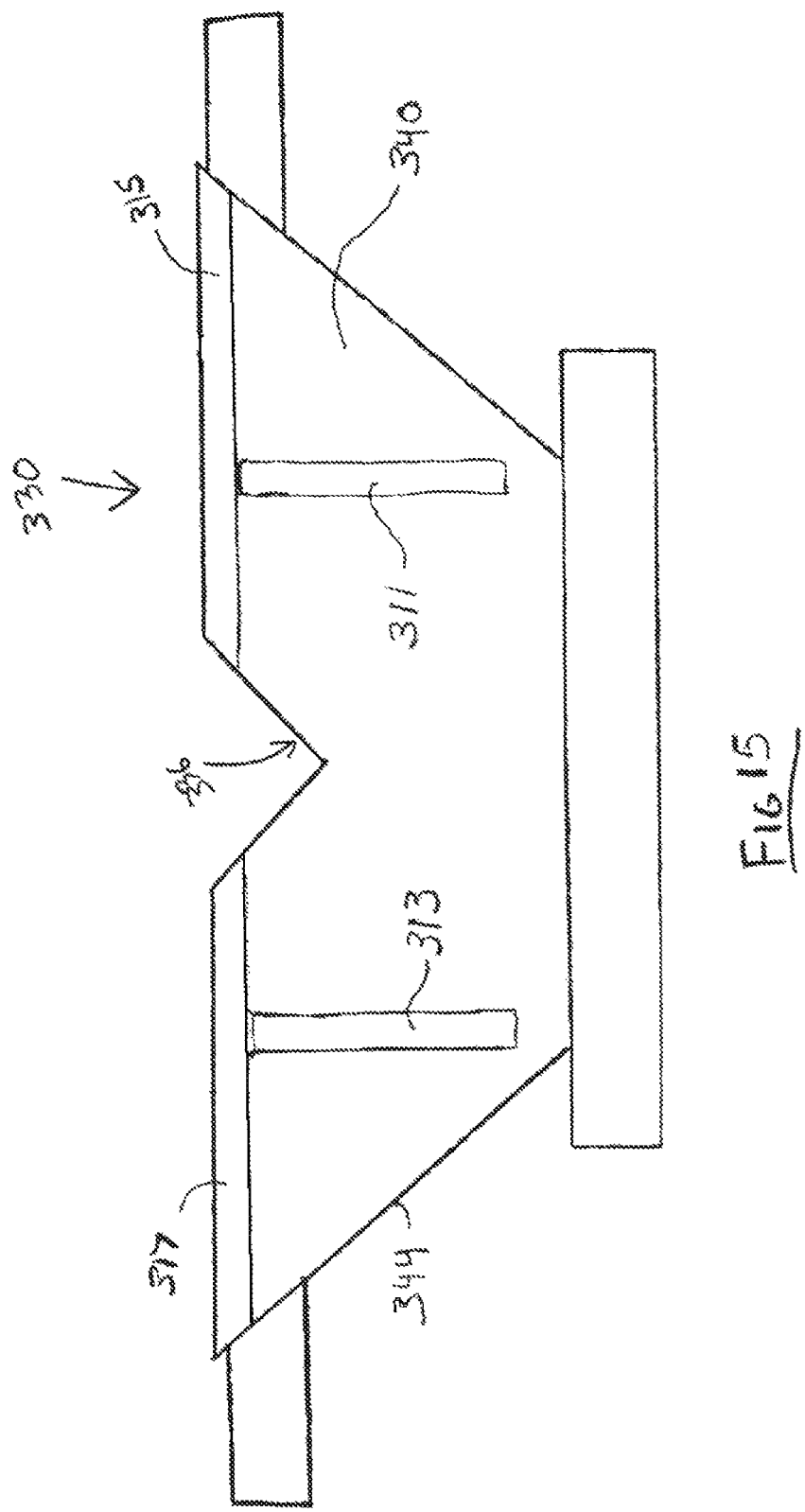

ACCESSORY SUPPORT BRACKET FOR A PORTABLE STRUCTURE

This application is a continuation of prior U.S. patent application Ser. No. 12/571,687—filed on Oct. 1, 2009 now abandoned and naming Steven J. Knasko as an inventor—which is herein incorporated by reference.

FIELD OF THE INVENTION

This invention relates to support brackets, particularly those that are used in portable enclosures, particularly supporting a camera or gun on the framework of a hunting blind.

BACKGROUND OF THE INVENTION

Interacting with animals, especially through hunting, bird watching, or photography, is a popular activity. Interacting with animals in a natural environment is preferable. In this way, animals must be prevented from detecting when an observer, hunter, or photographer is present. If this is not done, animals may be frightened and stay away from the location of the individual. Therefore, it is important to make the individual visually undetectable.

Blinds are often utilized to conceal individuals and equipment in such an environment. Numerous types of blinds exist, and many are generally portable and collapsible structures. A common type of hunting blind is one that is a cover portion supported by a framework. The cover portion could range anywhere from a rubber-like substance to a type of fabric material. This cover portion is held in a desired position and shape due to the structure of the framework, which is then supported by the ground. In a number of such blinds have a X-shaped framework on at least one side of the blind, such as disclosed in U.S. Pat. No. 6,296,415 and 7,320,332.

It is known in the prior art to have a support for a gun or camera located near a window of a blind such as described in U.S. Pat. No. 5,964,435. However, supports like those described are large and would be difficult to transport. Also, if more than one is needed, the task of transporting them becomes even greater. In addition, the support must be attached to the tent wall and supported on the ground, making guaranteed stability impossible on insubstantial or uneven terrain. The tent wall may not be of sufficient strength to support particular accessories. When the tent wall is made of fabric, supports depending on wall support are limited by the amount of force the wall will bear. Furthermore, the size and complexity of mounting makes their interchangeability cumbersome. Due to this, only one sort of support is provided that must try to suffice for all sorts of attachments.

The present inventor has recognized the need for a blind accessory support bracket that is reasonably small and easy to transport.

The present inventor has also recognized the need for a blind accessory support bracket that is securely mounted on a blind regardless of the terrain or blind location.

The present inventor has also recognized the need for a blind accessory support bracket that maximizes that utilizes the support frame work of a blind.

The present inventor has also recognized the need for a blind accessory support bracket that is capable of being designed for a specific accessory and interchanged with other specifically designed supports.

SUMMARY OF THE INVENTION

The present invention comprises a blind accessory support bracket for use with a blind tent or protable structure having an X-shaped frame component. This blind accessory support bracket includes a blind attachment portion coupled to an accessory support portion.

The blind attachment portion is similar for all different support apparatuses. The blind attachment portion has a body that is shaped to fit snugly into the top V-shape formed by the X-shaped framework of the blind. This body may be upside down triangularly shaped or upside down trapezoidally shaped. The body lies in the same plane as the X-shaped framework, and the sides of the body resting against the framework making up the top of the X-shape. Therefore, the blind attachment portion body is prevented from sliding down by the X-shaped framework of the blind. In this way, the blind accessory support bracket of the present invention may support as much downward force as the framework of the blind can withstand.

Further, the blind attachment portion contains retaining abutments to prevent movement of the blind accessory support bracket in a direction perpendicular to the plane in which the X-shaped framework lies. A top abutment and a bottom abutment extend out from the blind attachment portion body, in a direction substantially parallel to the plane of the ground. The top abutment is attached to the blind attachment portion body on a side outside of the X-shaped structure, toward the blind outer covering. The bottom abutment is attached to the blind attachment portion body on a side inside of the X-shaped structure, toward the inside of the blind. Both the top and bottom abutments are transverse to the X-shaped framework at their respective locations.

When the blind accessory support bracket is mounted on the blind, the top and bottom abutments press against the X-shaped framework of the blind on an outside and an inside, respectively. When an amount of weight is applied to the accessory support portion, a torque is applied to the blind attachment portion, pressing and securing the abutments on the framework with increased force. The blind accessory support bracket is prevented from becoming displaced inside of the framework by the top abutment and prevented from becoming displaced outside of the framework by the bottom abutment.

The accessory support portion may be of a number of configurations, and may serve a number of functions. One embodiment shows the accessory support portion as a camera brace or a gun brace. Different accessory support portions are designed depending on the different mounting mechanisms of the cameras or guns. In addition, the accessory support portion may comprise a shelf for use with a number of accessories.

The blind accessory support bracket is preferably located on the framework of a blind on the inside of an opening of the blind. Therefore, the camera or gun brace supports a camera or gun with a clear viewing and aiming medium. In this way, the activity becomes more easy and efficient through the assistance of the blind accessory support bracket.

BRIEF DESCRIPTION OF THE DRAWINGS

FIG. 1 is a perspective view of a blind accessory support bracket of the invention mounted on the framework of a blind, wherein the accessory support portion comprises a gun brace;

FIG. 2 is a rear view of the blind accessory support bracket of FIG. 1;

FIG. 3 is a front view of the blind accessory support bracket of FIG. 1;

FIG. 4 is a top view of the blind accessory support bracket of FIG. 1;

FIG. 5 is a bottom view of the blind accessory support bracket of FIG. 1;

FIG. 6 is a perspective view of a second embodiment of a blind accessory support bracket of the invention mounted on the framework of a blind, wherein the accessory support portion comprises a camera brace with camera mounting fastened thereon;

FIG. 7 is a rear bottom perspective view of the blind accessory support bracket of FIG. 6;

FIG. 13 is a bottom view of the blind accessory support bracket of FIG. 10;

FIG. 14 is a top view of the blind accessory support bracket of FIG. 10; and

FIG. 15 is a rear view of a fourth embodiment of a blind accessory support bracket.

DETAILED DESCRIPTION

Figure 5B:
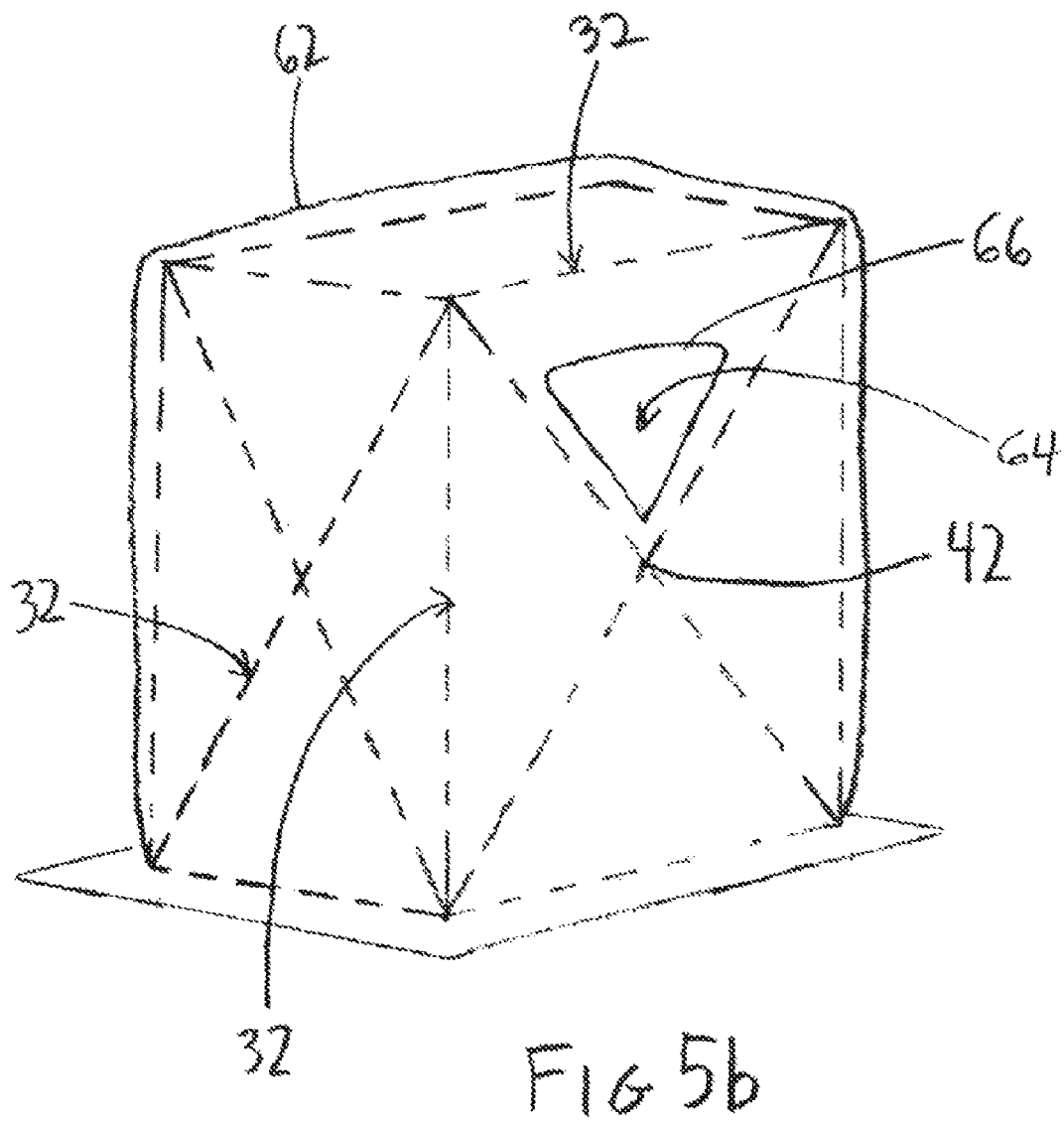
FIG. 5b is a perspective view of a blind with an internal framework shown with the use of dashed lines.
Figure 8:
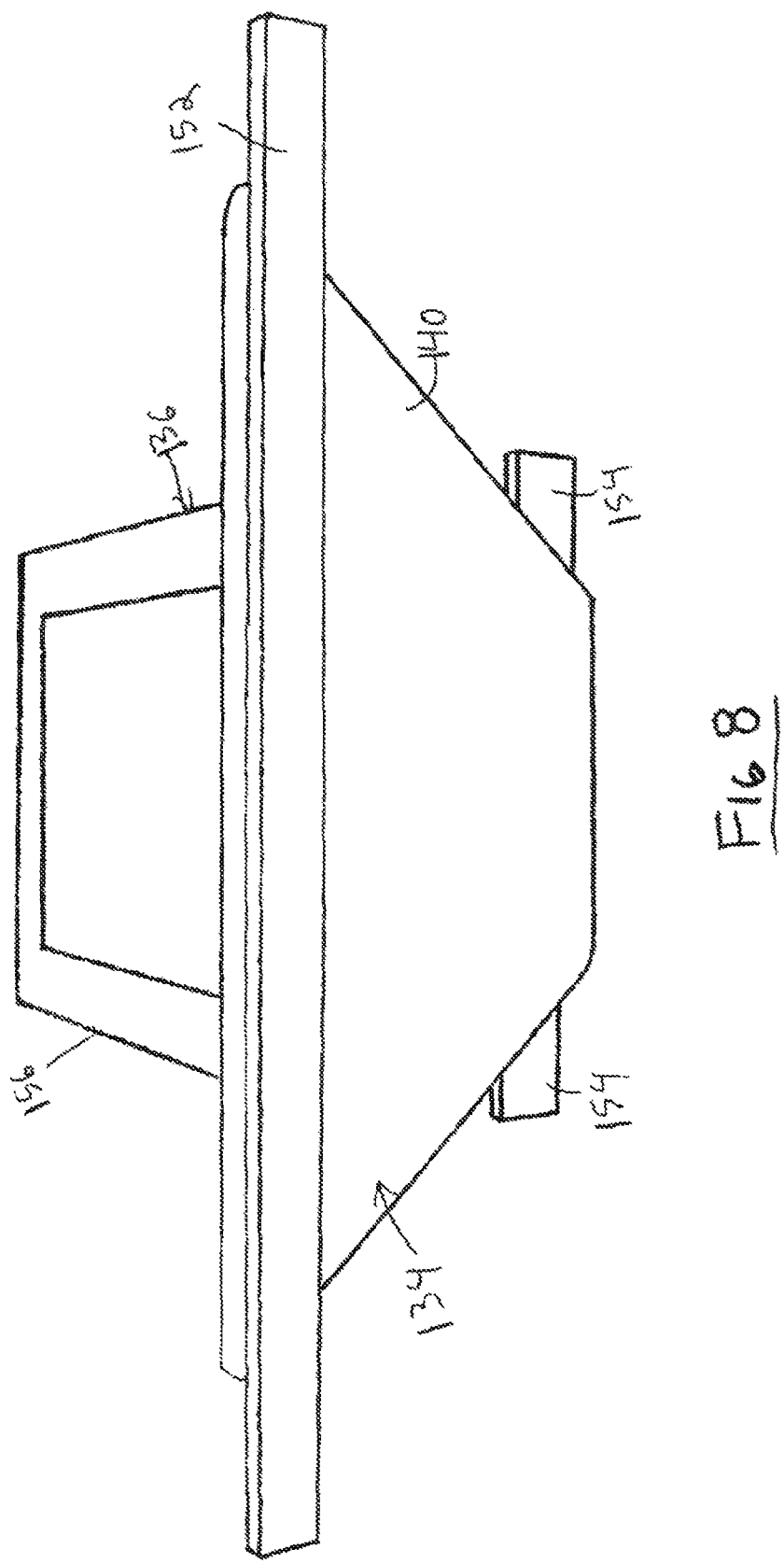
FIG. 8 is a front top perspective view of the blind accessory support bracket of FIG. 6;.
Figure 9:
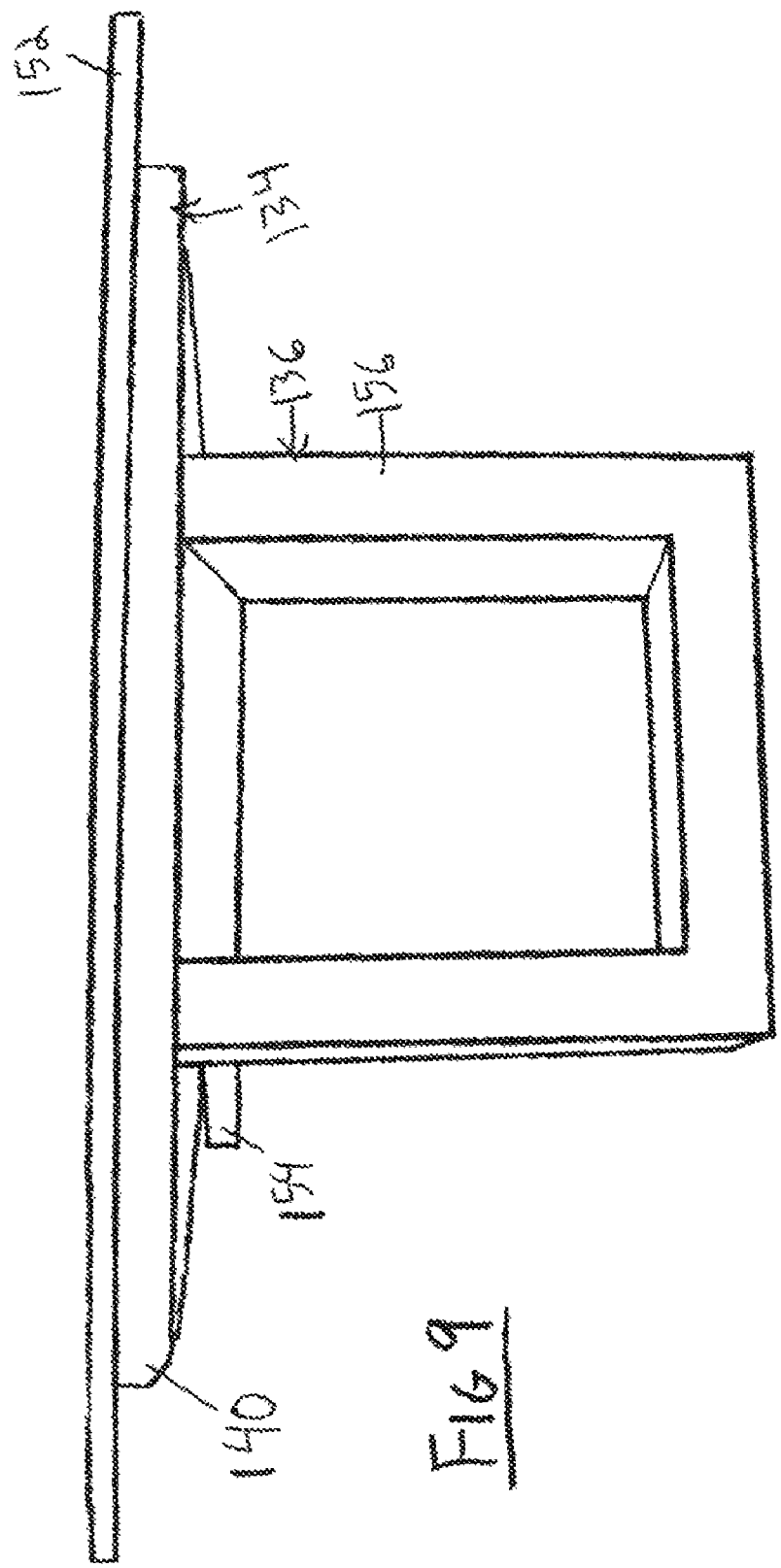
FIG. 9 is a top perspective view of the blind accessory support bracket of FIG. 6.
Figure 10:
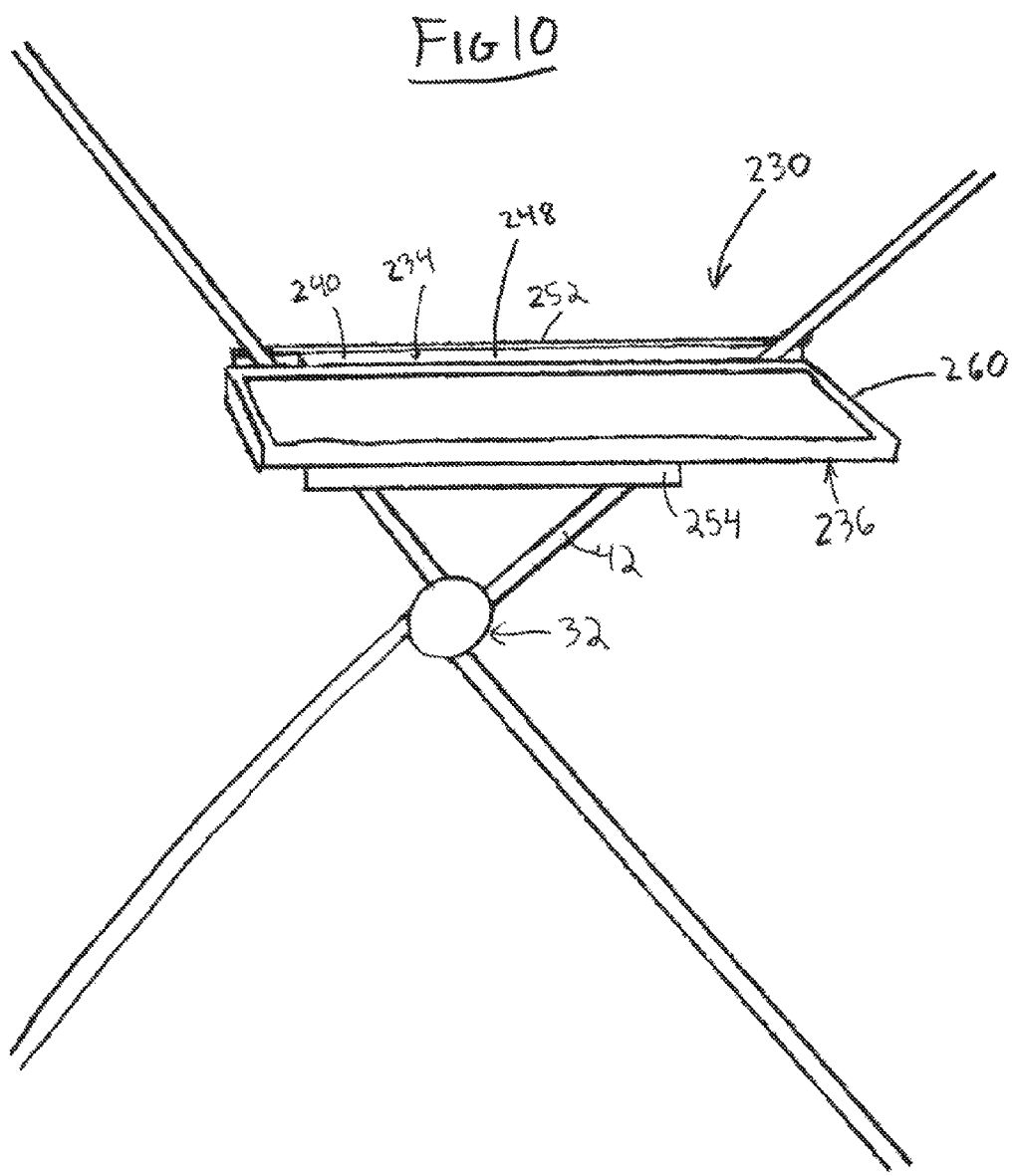
FIG. 10 is a perspective view of a third embodiment of a blind accessory support bracket of the invention mounted on the framework of a blind, wherein the accessory support portion comprises a shelf.
Figure 11:
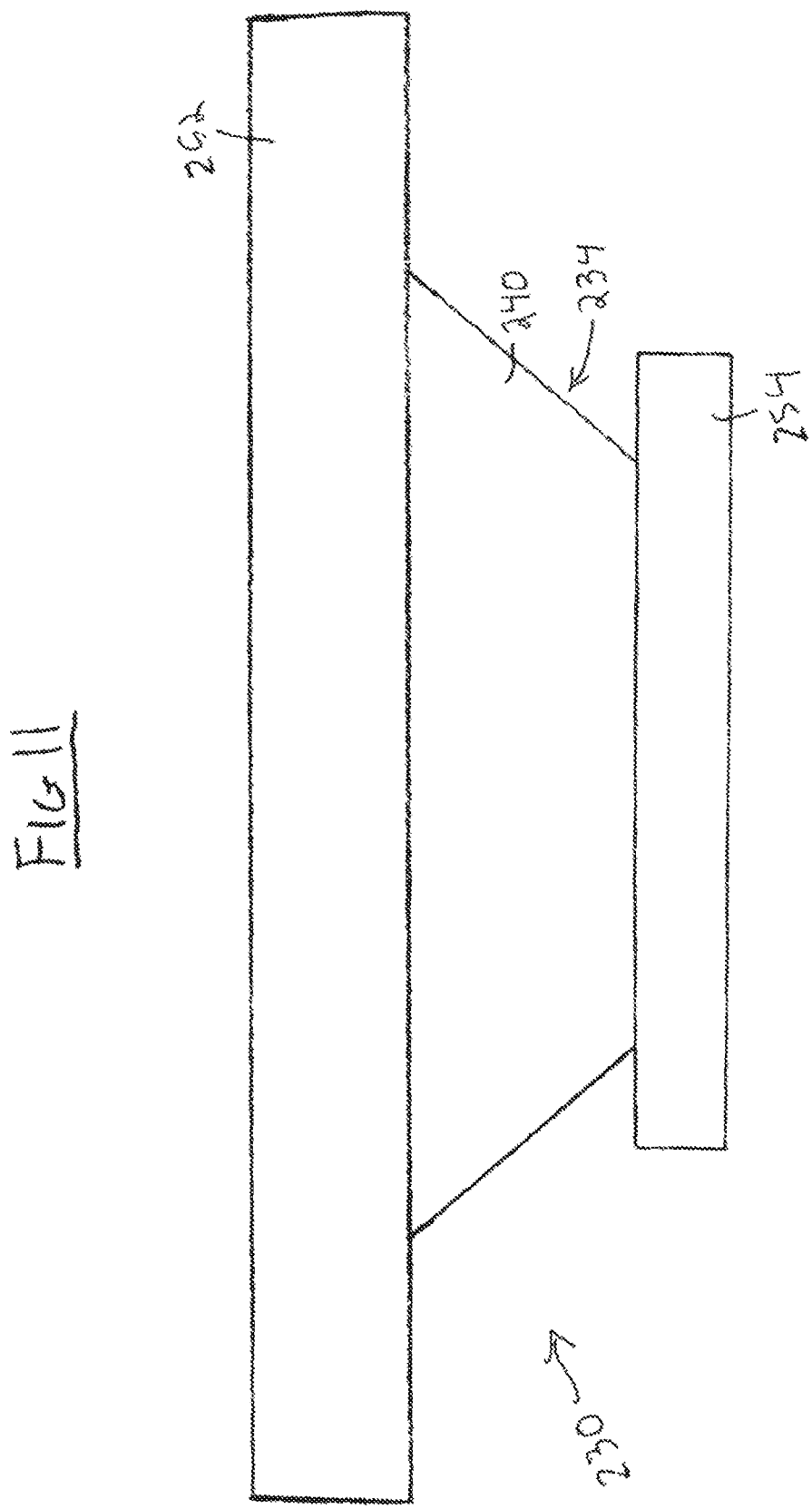
FIG. 11 is a front view of the blind accessory support bracket of FIG. 10.
Figure 12:
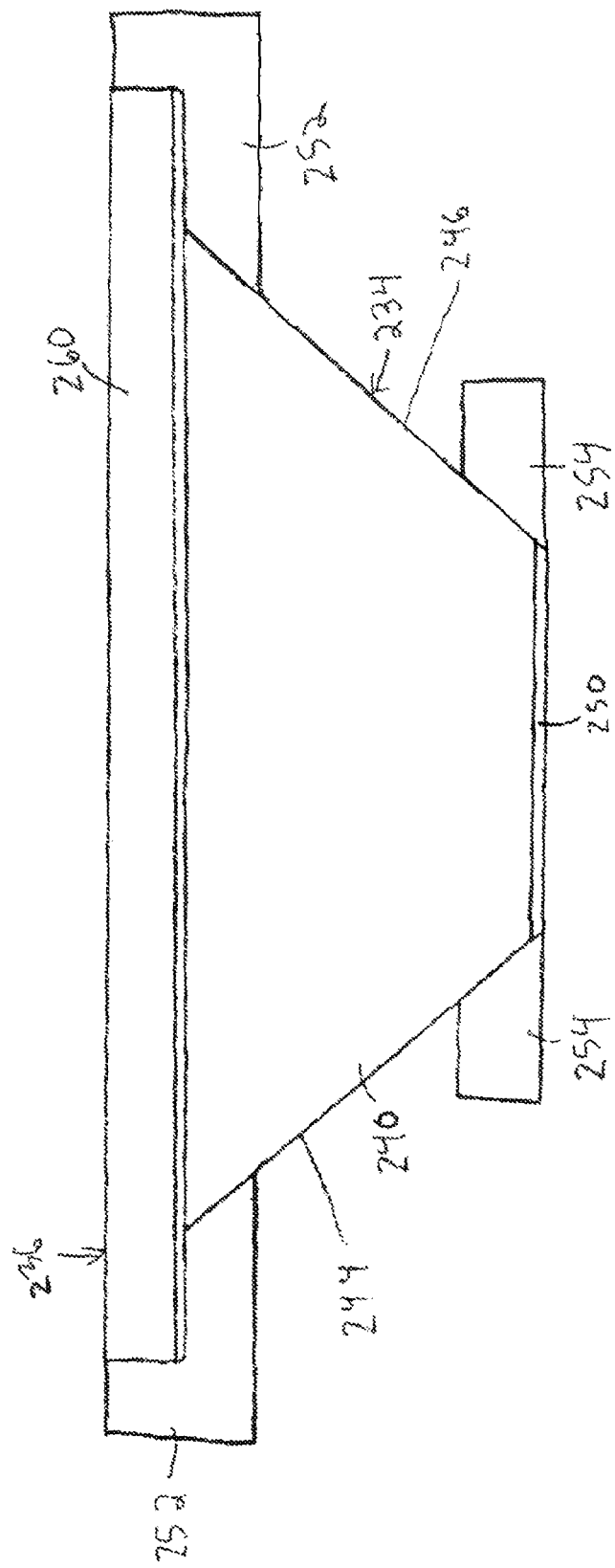
FIG. 12 is a rear view of the blind accessory support bracket of FIG. 10.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1-5 show one embodiment of the blind accessory support bracket 30 mounted on a frame 32 of a hunting blind, tent, or portable structure. The blind accessory support bracket 30 comprises a blind attachment portion 34 and an accessory support portion 36.

In this embodiment, the accessory support portion 36 comprises a notch 38 formed into a blind attachment portion body 40. Notch 38 may be sized, shaped, and configured to fit a gun barrel for support when hunting. In one embodiment, notch 38 is V-shaped in the center of the blind attachment portion body 40.

Blind attachment portion 34 rests on a portion of an X-shaped structure 42 of the framework 32. In one type of X-shaped framework, a first frame member 42a converges toward a second frame member 42b. The first and second frame members 42a, 42b converge to a connection point 42c. The first and second frame members 42a, 42b of the type shown in FIG. 1 are the upper V portion of the X-shaped framework.

Blind attachment portion body 40 is upside down trapezoidally shaped, with a first lateral side 44 and a second lateral side 46 configured to rest against X-shaped structure 42. The first lateral side 44 is shaped to rest on the first converging frame member 42a and the second lateral side 46 is shaped to rest against the second converging frame member. In one embodiment, the lateral sides 44, 46 are shaped to contact the corresponding converging frame members 42a, 42b along substantially the entire surface of the lateral sides 44, 46. The lateral sides have a front edge 44a, 46a and a back edge 44b, 46b defining a width of each lateral side.

While the embodiment shown is a trapezoidal shape, other shapes fitting with the top of an X-shaped structure are possible configuration of the accessory support bracket 30. Blind attachment portion body 40 also has a top 48 and bottom 50 that are substantially parallel. Blind attachment portion body 40 lies in the same plane as X-shaped structure 42. The sides 44, 46 press down against X-shaped structure 42 and resist the tendency of the blind accessory support bracket 30 to fall downward. Blind attachment portion body 40 may be injection molded out of plastic or made of another material such as wood or metal.

Blind attachment portion 34 also comprises a top abutment 52 and a bottom abutment 54. Abutments 52, 54 extend out from blind attachment portion body 40 in a direction substantially parallel to top 48 and bottom 50. It is also possible for the abutments to extend from the body 40 at angles other than parallel to the top 48 or the bottom 50. Abutment 52 extends in front of the X-shaped structure 42 and the abutment 55 extends behind the X-shaped structure. Abutments 52, 54 may be injection molded out of plastic or made of another material such as wood or metal. The abutments may also be integrally molded with the body 40 to form one unified component.

Top abutment 52 is positioned on a forward side of the X-shaped structure 42 in relation to an inside location 64. The inside location 64 is where the user is on the inside of the blind, tent, or support structure. If the blind is not a fully enclosed structure, the inside user location 64 is behind the a wall having the X-shaped structure with a support 30. Top abutment 52 prevents the motion of the blind accessory support bracket 30 in a direction out of the plane of the X-shaped structure, and toward the inside location 64.

The top abutment 52 has two inside facing portions 52a, 52b at opposite lateral ends of the abutment 52. The first inside face 52a of the abutment 52 and the adjacent portion of the sidewall 44 form a L-shaped channel portion 52c for receiving the frame member 42a. Likewise a second inside face 52b and the adjaucent portion of the sidewall 46 form an L-shaped channel portion 52d for receiving the frame member 42b.

Bottom abutment 54 is located on a near side of X-shaped structure 42, with respect to the inside location 64. Bottom abutment 54 prevents the motion of the blind accessory support bracket 30 in a direction out of the plane of the X-shaped structure 42, and away from the inside location 64. With these provisions, the blind accessory support bracket 30 is provided with resistance to motion in the forward, rearward, and downward directions and provides significant stability.

The bottom abutment 54 has two inside facing portions 54a, 54b at opposite lateral ends of the abutment 54. The first inside face 54a and the adjacent portion of the sidewall 44 form a L-shaped channel portion 54c for receiving the frame member 42a. Likewise a second inside face 54b and the adjacent portion of the sidewall 46 form an L-shaped channel portion 54d for receiving the frame member 42b.

While the embodiment shown provides channel portions 52c, 52d, 54c, 54d, in an alternatively embodiment the channel portions comprise channels extending along both the front and back sides of a frame member 42a or 42b and extending along the length of the side wall and when positioned on a frame 42.

FIG. 5b shows the outside of a blind to be used in connection with the present invention. Blind covering 62 lies on the framework 32. Blind covering 62 encloses the inside location 64. Framework 32 is located inside blind covering 62, but is shown here with the use of dashed lines. An opening 66 is shown just above X-shaped structure 42. The opening 66 is shown as a triangle shape but may take other forms, including square or rectangle. The blind accessory support bracket 30 is preferably mounted on X-shaped structure so that the accessories being supported thereby are readily alignable with the opening 66.

FIGS. 6-9 show second embodiment of a blind accessory support bracket 130 mounted on the framework 32 of a hunting blind. The blind accessory support bracket 130 comprises a blind attachment portion 134 and an accessory support portion 136.

Blind attachment portion 134 rests on an X-shaped structure 42 of framework 32. Blind attachment portion body 140 is upside down trapezoidally shaped, with sides 144, 146 configured to rest against X-shaped structure 42. The body 140 is similar in structure to the body 40. Blind attachment portion body 140 also has a top 148 and bottom 150 that are substantially parallel. Blind attachment portion body 140 lies in the same plane as X-shaped structure 42. The sides 144, 146 press down against X-shaped structure 42 and resist the tendency of the blind accessory support bracket 130 to fall downward. Blind attachment portion body 140 may be injection molded out of plastic or made of another material such as wood or metal.

Blind attachment portion 134 also comprises a top abutment 152 and a bottom abutment 154. Abutments 152, 154 extend out from blind attachment portion body 140 in a direction substantially parallel to top 148 and bottom 150. Abutments 152, 154 are transverse to the X-shaped structure 42. Abutments 152, 154 may be injection molded out of plastic or made of another material such as wood or metal.

Top abutment 152 is positioned on a forward side of the X-shaped structure 42, with respect to the inside location 64. Top abutment 152 prevents the motion of the blind accessory support bracket 130 in a direction out of the plane of the X-shaped structure, and toward the inside location 64.

Bottom abutment 154 is located on a near side of X-shaped structure 42, with respect to a blind location 64. Bottom abutment 154 prevents the motion of the blind accessory support bracket 130 in a direction out of the plane of the X-shaped structure 42, and away from the location 64. With these provisions, the blind accessory support bracket 130 is provided with resistance to motion in the forward, rearward, and downward directions and provides significant stability.

In this second embodiment, however, the accessory support portion 136 comprises a camera brace 156. Camera brace 156 is mounted on a near side of blind attachment portion 134, with respect to the inside location 64. FIG. 6 shows a camera stand 158 clamped onto camera brace 156. In one embodiment the camera brace 156 is a squared annular shape. Accessory support portion 136 comprising a camera brace 156 may be injection molded with the rest of blind accessory support bracket 130, or made of another material such as wood or metal. The Accessory support may be integrally molded or formed with the body 140 to comprise a unitary part.

A third embodiment is shown in FIGS. 10-14. In this embodiment, a blind accessory support bracket 230 is mounted on the framework 32 of a hunting blind. The blind accessory support bracket 230 comprises a blind attachment portion 234 and an accessory support portion 236.

Blind attachment portion 234 rests on an X-shaped structure 42 of framework 32. Blind attachment portion body 240 is upside down trapezoidally shaped, with sides 244, 246 configured to rest against X-shaped structure 42. The body 140 is similar in structure to the body 40. Blind attachment portion body 240 also has a top 248 and bottom 250 that are substantially parallel. Blind attachment portion body 240 lies in the same plane as X-shaped structure 42. The sides 244, 246 press down against X-shaped structure 42 and resist the tendency of the blind accessory support bracket 230 to fall downward. Blind attachment portion body 240 may be injection molded out of plastic or made of another material such as wood or metal.

Blind attachment portion 234 also comprises a top abutment 252 and a bottom abutment 254. Abutments 252, 254 extend out from blind attachment portion body 240 in a direction substantially parallel to top 248 and bottom 250. Abutments 252, 254 are transverse to the X-shaped structure 42. Abutments 252, 254 may be injection molded out of plastic or made of another material such as wood or metal.

Top abutment 252 on a forward side of the X-shaped structure 42, with respect to the inside location 64. Top abutment 252 prevents the motion of the blind accessory support bracket 230 in a direction out of the plane of the X-shaped structure, and toward the inside location 64.

Bottom abutment 254 is located on a near side of X-shaped structure 42, with respect to the inside location 64. Bottom abutment 254 prevents the motion of the blind accessory support bracket 230 in a direction out of the plane of the X-shaped structure 42, and away from the inside location 64. With these provisions, the blind accessory support bracket 230 is provided with resistance to motion in the forward, rearward, and downward directions and provides significant stability.

In this third embodiment, the accessory support portion comprises a shelf 260. Shelf 260 is attached on a near side of blind attachment portion 234, with respect to a inside location 64. Accessory support portion 236 comprising a shelf 260 may be injection molded with the rest of blind accessory support bracket 230, or made of another material such as wood or metal.

In a fourth embodiment, as shown in FIG. 15, the blind accessory support bracket 330 comprises a blind attachment portion body 340. The support bracket is configured to engage one or more accessory support portions, such as accessory support portions 136, 236. The accessory support portions 136, 236 are interchangeably and detachably connectable with the blind attachment portion body 340.

The blind attachment portion body 340 has an engagement device for securing the attachment support portions to the body 340. The engagement device may comprise any number of means of securing one component to another component. The engagement device may comprise channels 311, 313 for lockably receiving end portions 156a, 156b of the camera brace 156. The engagement device may have a horizontal channel 317, 315 for lockably receiving a front end engagement portion 260a of the shelf 260. The engagement device may comprise dovetailed channels for slidably receiving dovetail members of the accessory support portion. The engagement device may also comprise other devices and methods of releasably attaching one component to another component, such as a lock and release mechanism. While the blind accessory support bracket 330 is shown in FIG. 15 with an accessory support portion 336, the accessory support portion 336 is optional in an embodiment configured to interchangeably and detachably connect various accessory support portions.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A self-standing portable enclosure, comprising:
a frame with at least two converging frame members;
an accessory support device comprising a body comprising opposite lateral sidewalls where each side converges toward the other, the lateral sidewalls configured to rest against the at least two converging frame members of the portable enclosure to support the body;
the body comprising a plurality of securing members configured to secure the body between the at least two converging frame members; and
the body comprising a first accessory support structure, which is rigidly connected to the body by a rigid engagement device at least partially located on the body, the first accessory support structure is completely detachable from the body.

2. The self-standing portable enclosure according to claim 1, wherein the opposite lateral sides of the body are a first lateral sidewall and a second lateral sidewall; the first lateral sidewall configured to rest against a first converging frame member of said at least two converging frame members of the portable enclosure, the opposite second lateral sidewall configured to rest against a second converging frame member of said at least two converging frame members of the portable enclosure; and
wherein the body comprise at least two support raceways and the securing members are located adjacent to opposite lateral sides of each of the frame engaging contact surfaces to form the support raceways;
the body is configured to be supported in the raceways between adjacent securing members independent of the rigid engagement device and independent of the first accessory support.

3. The self-standing portable enclosure according to claim 1, wherein the body comprises a second accessory support being a gun brace comprising a notch for supporting a barrel of a gun.

4. The self-standing portable enclosure according to claim 1, wherein the first accessory support structure comprises a squared annular ring configured to receive a camera or camera support.

5. The self-standing portable enclosure according to claim 1, wherein the first accessory support structure comprises a shelf.

6. The self-standing portable enclosure according to claim 1, wherein each side wall comprising a first front edge and a back edge defining the width of the sidewall;
said securing members comprise a first abutment and a second abutment;
the first and second abutments extending beyond the plane that extends along the width of the first side wall, the first abutment extending laterally from the front edge, the second abutment extending laterally from the back edge wherein a first channel portion is formed between the sidewall and the first abutment and a second channel portion is formed between the sidewall and the second abutment and each channel portion configured to support the body on a frame member of the enclosure.

7. The self-standing portable enclosure according to claim 6, said securing members comprise a third abutment and a fourth abutment;
the third and fourth abutments extending beyond the plane that extends along the width of the second side wall opposite the first side wall, the third abutment extending laterally from the front edge, the fourth abutment extending laterally from the back edge wherein a third channel portion is formed between the sidewall and the third abutment and a fourth channel portion is formed between the sidewall and the fourth abutment and each channel portion configured to support the body on a frame member of the enclosure.

8. The self-standing portable enclosure according to claim 1, wherein said securing members comprise a first abutment, the first abutment located near a top side of said body and longitudinally forward of said sidewalls, a second abutment, the second abutment located near the bottom of said body and longitudinally rearward of said sidewalls.

9. An accessory support device for a self-standing portable enclosure having a frame with converging frame cross-members, the accessory support device comprising:
a body comprising opposite lateral frame engaging contact surfaces where each surface converges toward the other, the lateral frame engaging contact surfaces configured to rest against converging frame cross-members of the self-standing portable enclosure to support the body;
the body comprising at least two support raceways and a plurality of securing members configured to secure the body between the converging frame cross-members; the securing members are located adjacent to opposite lateral sides of each of the frame engaging contact surfaces to form the support raceways;
the body comprising a first accessory support portion;
an engagement device configured to detachably connect a second accessory support structure to the body, the second accessory support structure comprising at least one rigid surface for supporting an accessory, the engagement device providing a non-pivotable rigid connection between the body and the second accessory support structure sufficient to support the weight of the second accessory support,the engagement device supporting the second accessory support structure in a cantilever fashion from the body;
the engagement device is configured to enable complete detachment of the second accessory support structure from the body by a user;
the body is configured to be supported in the raceways on the contact surfaces between adjacent securing members independent of the engagement device and independent of the second accessory support; and,
the second accessory support structure comprises a camera mount.

10. The accessory support device according to claim 9, wherein the first accessory support portion comprises a notch in the top surface of the body for supporting the barrel of a gun.

11. The accessory support device according to claim 9, comprising a third accessory support structure configured to detachably connect to the body, wherein the second and third accessory support structure are interchangeably connectable to the body the third accessory support structure comprises a shelf.

12. The accessory support device according to claim 9, wherein the securing members extend laterally beyond the lateral frame engaging contact surfaces to limit the forward or rearward movement of the body in relation to the converging frame cross-members.

13. An accessory support device for a self-standing portable enclosing having a frame with converging cross-members, the accessory support device comprising:
a body comprising opposite lateral frame engaging contact surfaces where each surface converging toward the other, the lateral surface configured to rest against converging frame cross-member of the self-standing portable enclosure to support the body;

the body comprising at least two support raceways and a plurality of securing members configured to secure the body between the converging cross-members; the securing members are located adjacent to opposite lateral sides of each of the frame engaging contact surfaces to form the support raceways;

the body comprising a first accessory support portion and an engagement device configured to detachably connect a second accessory support structure to the body, the second accessory support structure comprising at least one rigid surface for supporting an accessory, the engagement device providing a non-pivotable rigid connection between the body and the second accessory support structure sufficient to support the weight of the second accessory support;

the engagement device is configured to enable complete detachment of the second accessory support structure from the body by a user;

the body is configured to be supported in the raceways on the contact surfaces between adjacent securing members independent of the engagement device and independent of the second accessory support;

the engagement device comprises at least one dovetail groove and at least one corresponding dovetail member, the body or the second accessory support structure comprises the at least one dovetail groove and the other of the body or the second accessory support structure comprises the corresponding dovetail member configured to be received in the dovetail groove to connect the second accessory support structure to the body.

14. An accessory support device for a self-standing portable enclosure having a frame with converging frame cross-members, the accessory support device comprising:

a body comprising opposite lateral frame engaging contact surfaces where each surface converges toward the other, the lateral frame engaging contact surfaces configured to rest against converging frame cross-members of the self-standing portable enclosure to support the body;

the body comprising at least two support raceways and a plurality of securing members configured to secure the body between the converging frame cross-members; the securing members are located adjacent to opposite lateral sides of each of the frame engaging contact surfaces to form the support raceways;

the body comprising a first accessory support portion;

an engagement device configured to detachably connect a second accessory support structure to the body, the second accessory support structure comprising at least one rigid surface for supporting an accessory, the engagement device providing a non-pivotable rigid connection between the body and the second accessory support structure sufficient to support the weight of the second accessory support, the engagement device supporting the second accessory support structure in a cantilever fashion from the body;

the engagement device is configured to enable complete detachment of the second accessory support structure from the body by a user;

the body is configured to be supported in the raceways on the contact surfaces between adjacent securing members independent of the engagement device and independent of the second accessory support;

a third accessory support structure configured to detachably connect to the body, wherein the second and third accessory support structures are interchangeably connectable to the body; and, the first accessory support portion is a gun brace comprising a notch extending vertically into a top horizontal surface of the body for supporting the barrel of a gun positioned at least partially below the top surface of the body when in the notch, the second accessory support structure is a shelf; and the third accessory support structure is a camera mount.

15. The accessory support device of claim 9, comprising a third accessory support structure configured to detachably connect to the body, wherein the second and third accessory support structures are interchangeably connectable to the body; the first accessory support portion is a gun brace comprising a notch located in a vertical plane of the body for supporting the barrel of a gun, the third accessory support structure comprises a shelf; the shelf and the gun brace are each located along a portion of a top edge of the body when the shelf is connected to the body, the shelf extents perpendicularly from the body.

* * * * *